United States Patent
Paulsen et al.

(10) Patent No.: US 9,740,342 B2
(45) Date of Patent: Aug. 22, 2017

(54) METHOD FOR PREVENTING INTERFERENCE OF CONTACTLESS CARD READER AND TOUCH FUNCTIONS WHEN THEY ARE PHYSICALLY AND LOGICALLY BOUND TOGETHER FOR IMPROVED AUTHENTICATION SECURITY

(71) Applicant: CIRQUE CORPORATION, Salt Lake City, UT (US)

(72) Inventors: Keith L. Paulsen, Centerville, UT (US); Andrew Paulsen, Salt Lake City, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 361 days.

(21) Appl. No.: 13/720,075

(22) Filed: Dec. 19, 2012

(65) Prior Publication Data

US 2013/0162594 A1 Jun. 27, 2013

Related U.S. Application Data

(60) Provisional application No. 61/579,846, filed on Dec. 23, 2011.

(51) Int. Cl.
| | |
|---|---|
| *H01Q 1/48* | (2006.01) |
| *G06F 3/044* | (2006.01) |
| *H01Q 1/22* | (2006.01) |
| *H01Q 21/28* | (2006.01) |
| *G06F 3/041* | (2006.01) |

(52) U.S. Cl.
CPC .............. *G06F 3/044* (2013.01); *G06F 3/041* (2013.01); *H01Q 1/22* (2013.01); *H01Q 1/48* (2013.01); *H01Q 21/28* (2013.01)

(58) Field of Classification Search
CPC .................................................... H04B 5/0087
USPC .............................. 455/41.1, 41.2, 41.3, 566
See application file for complete search history.

(56) References Cited

U.S. PATENT DOCUMENTS

| | | | |
|---|---|---|---|
| 5,856,822 A | 1/1999 | Du et al. | |
| 6,380,930 B1 | 4/2002 | Van Ruymbeke | |
| 6,486,862 B1 | 11/2002 | Jacobsen | |
| 6,700,567 B1* | 3/2004 | Jaeger .................. | G06F 3/0317 178/19.01 |
| 6,867,981 B2 | 3/2005 | Murohara | |
| 7,306,144 B2 | 12/2007 | Moore et al. | |
| 7,546,106 B2* | 6/2009 | Kuroda .................... | H04B 5/02 174/262 |
| 7,834,843 B2* | 11/2010 | Karaki .................. | B41J 3/4076 178/18.03 |

(Continued)

FOREIGN PATENT DOCUMENTS

| | | |
|---|---|---|
| CN | 2436978 Y | 6/2001 |
| CN | 1490713 A | 4/2004 |

(Continued)

*Primary Examiner* — Wen Huang
(74) *Attorney, Agent, or Firm* — Morriss O'Bryant Compagni PC

(57) ABSTRACT

A system for physically and logically integrating near field communication technology, touch sensor technology and display technology by using a more powerful near field communication antenna disposed under the touch sensor and display screen for transmitting, and a smaller near field communication antenna on top of the touch sensor for receiving near field communication signals.

39 Claims, 9 Drawing Sheets

(56) References Cited

U.S. PATENT DOCUMENTS

| | | | |
|---|---|---|---|
| 2002/0135568 A1* | 9/2002 | Chen | 345/173 |
| 2003/0172279 A1 | 9/2003 | Yudasaka | |
| 2004/0077313 A1 | 4/2004 | Oba | |
| 2005/0001711 A1 | 1/2005 | Doughty | |
| 2007/0239981 A1 | 10/2007 | Lessing | |
| 2007/0287503 A1* | 12/2007 | Ying et al. | 455/566 |
| 2008/0143683 A1 | 6/2008 | Hotelling | |
| 2009/0137204 A1* | 5/2009 | Chang | 455/41.1 |
| 2010/0059355 A1 | 3/2010 | Lefebvre | |
| 2010/0127828 A1 | 5/2010 | Connolly et al. | |
| 2010/0297952 A1* | 11/2010 | Rofougaran | 455/73 |
| 2010/0315389 A1* | 12/2010 | Sorrell et al. | 345/204 |
| 2011/0012793 A1 | 1/2011 | Amm et al. | |
| 2011/0057891 A1 | 3/2011 | Ham et al. | |
| 2011/0063224 A1 | 3/2011 | Vexo et al. | |
| 2011/0065383 A1* | 3/2011 | Frankland | H01Q 7/00 455/41.1 |
| 2011/0134051 A1* | 6/2011 | Lin | 345/173 |
| 2011/0248940 A1* | 10/2011 | Chuang et al. | 345/173 |
| 2011/0273382 A1* | 11/2011 | Yoo et al. | 345/173 |
| 2011/0275421 A1 | 11/2011 | Wong et al. | |
| 2012/0050015 A1* | 3/2012 | Low et al. | 340/10.1 |
| 2012/0162032 A1* | 6/2012 | Yang | H01Q 1/2266 343/720 |
| 2012/0162128 A1* | 6/2012 | Hyoung et al. | 345/174 |
| 2012/0287003 A1* | 11/2012 | Kao et al. | 343/702 |
| 2013/0059532 A1* | 3/2013 | Mahanfar et al. | 455/41.1 |
| 2013/0090073 A1* | 4/2013 | Zhu et al. | 455/90.2 |
| 2015/0008756 A1* | 1/2015 | Lee | H02J 17/00 307/104 |

FOREIGN PATENT DOCUMENTS

| | | |
|---|---|---|
| JP | H06318136 A | 11/1994 |
| JP | 2001202483 A | 7/2001 |
| JP | 2002215330 A | 8/2002 |
| JP | 2002268768 A | 9/2002 |
| JP | 2002268786 A | 9/2002 |
| JP | 2002540512 A | 11/2002 |
| JP | 2003087263 A | 3/2003 |
| JP | 2007257483 A | 10/2007 |
| JP | 2010010929 A | 1/2010 |
| KR | 1020010086928 A | 9/2001 |
| WO | 2009041366 A2 | 1/2009 |
| WO | 2011111369 A1 | 9/2011 |

* cited by examiner

METHOD FOR PREVENTING INTERFERENCE OF CONTACTLESS CARD READER AND TOUCH FUNCTIONS WHEN THEY ARE PHYSICALLY AND LOGICALLY BOUND TOGETHER FOR IMPROVED AUTHENTICATION SECURITY

CROSS REFERENCE TO RELATED APPLICATIONS

This document claims priority to and incorporates by reference all of the subject matter included in the provisional patent application No. 61/579,846, filed Dec. 23, 2011.

BACKGROUND OF THE INVENTION

Field of the Invention

This invention relates generally to touch sensors, near field communication technology such as NFC technology that is found in contactless smart cards, and a display. More specifically, the present invention physically and logically combines near field communication technology, touch sensor technology and display technology by using a more powerful near field communication antenna disposed under or around a perimeter of the touch sensor and display screen for transmitting, and a smaller near field communication antenna under or on top of the touch sensor for receiving near field communication signals. The system may also enable the shared use of certain components for the purposes of each of these functions, thereby offering increased security from attack by more closely integrating the physical and logical operations while offering simultaneous and independent operation of each.

Description of Related Art

There are several designs for capacitance sensitive touchpads. It is useful to examine the underlying technology to better understand how any capacitance sensitive touchpad can be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

Previously patented technology describes two-factor or three-factor user authentication methods such as described in U.S. Pat. No. 7,306,144 (the 144 patent), wherein using a debit ATM card or accessing protected information or a secure location, it is often desirable to integrate the function of verifying the identity of the user. Verifying identity using a two-factor system may be accomplished using (1) something the user has, such as an account number and one time password generated inside of a contactless card or cell phone, and (2) something that only the user knows, such as a secret PIN/password. Verifying using a three-factor system provides an additional layer of security by adding (3) some user biometric such as a user's fingerprint.

Responding to this desire, the 144 patent was obtained which integrated a contactless card reader touch screen and the biometric contactless touchpad to provide the ability to the payment industry to create applications such as near field communication (NFC) enabled touch screen PIN entry devices and NFC enabled laptop computers for the networking industry. These devices may be used to create secure VPN login devices to give access to remote business networks, and for the physical security industry to create secure token entry devices, such as for building access. The NFC capabilities include contactless card reader functions that enable the reading of data on a smart card, smart phone or other device that may store data that can be read using wireless communication such as through NFC.

In the 144 patent, the integrated contactless card reader is integrated into the hardware of a touchpad, wherein the circuit board substrate of the touchpad provides a mechanical substrate on which the hardware of the contactless card reader can be disposed, and wherein the touchpad is already widely distributed in other electronic appliances and as a stand-alone device.

The 144 patent describes "a contactless smart card reader that is integrated into the hardware of a touchpad, wherein the circuit board substrate of the touchpad provides a mechanical substrate on which the hardware of the contactless smart card reader can be disposed, and wherein the touchpad is already widely distributed in other electronic appliances, and as a stand-alone device . . . . Such electronic appliances that incorporate a touchpad include many portable electronic appliances such as laptop computers, personal digital assistants (PDAs), mobile telephones, digital cameras, digital camcorders, etc." . . . The Cirque® GLIDE-POINT® technology is also integrated into devices that are not designed to be mobile, such as point-of-sale input devices. For example, when a user provides a credit card or a debit card to a cashier for a purchase, it is common to see a dumb card reader that enables the credit or debit card to be swiped in order to read a magnetic strip. The user then typically uses a pen that is coupled to the dumb card reader and either enters a signature or a debit card number. Thus, the CIRQUE® GLIDEPOINT® technology is capable of receiving diverse forms of user input."

An example of an integrated contactless touchpad is constructed by placing a wire loop antenna or copper traces around the touch sensor. The drawback to this design is that many of the physical structures of the touchpad sensors and the contactless card reader interfere mechanically with each other, as well as electrically.

In an example of a mechanical problem, the touchpad sensor is often too large to support placement of an appropriately sized contactless card reader antenna due to constraints of the standards for contactless card reader operative volume, thereby limiting the practical size of an integrated system.

In an example of an interference problem, the strong magnetic field necessary to power the contactless card reader creates strong eddy currents within the touchpad sensor, thereby causing operation outside of specifications, and malfunctions or inoperability is the result.

In a related interference problem, the touchpad creates strong electrostatic fields that are necessary to detect a finger. These strong fields often cause the contactless card reader to have insufficient signal integrity.

The adverse effects of both the electrostatic fields and magnetic interference is often a result of 1) the contactless card reader signal causing non-linear effects due to noise/interference signal levels being large enough to trigger ESD diodes in touchpad circuitry, 2) difficulty for the touchpad front-end electronics or analog-to-digital converters (ADCs) in tracking the interference also causing non-linear effects and error in measurement, and 3) the amplitude modulation frequency of NFC is often very close to the touch sensing stimulus frequency, thereby creating in-band ground bounce.

Accordingly, what is needed are new techniques for physically combining the area of operation of NFC technology and a touch sensor that will enable integration of an appropriately sized NFC antenna near the touch sensor that accommodates the physical interference of components, especially when using different materials such as ITO and copper traces.

It would be a further advantage to dispose the circuitry of these systems near enough to each other to prevent eavesdropping or tapping into the signals between them to thereby provide an integrated system that is more secure than existing integrated systems. It would be an advantage to provide new techniques that will remove the electrical and magnetic interaction between the two systems of a contactless card reader and a touchpad. It would also be of benefit to integrate the electronics into a single package to address the very limited space of the touchpad and associated routing space typical of today's small and portable electronic appliances. It is also important to control an operating or active volume because of limitations of standards that control operation of an NFC antenna.

BRIEF SUMMARY OF THE INVENTION

In a preferred embodiment, the present invention is a system for physically and logically integrating near field communication technology, touch sensor technology and display technology by using a more powerful near field communication antenna disposed under or around a perimeter of the touch sensor and display screen for transmitting, and a smaller near field communication antenna that is under or on top of the touch sensor for receiving near field communication signals, wherein the system may also enable the shared use of certain components for the functions of the touch sensor technology, near field communication technology and display technology, wherein the integrated systems are made more secure from attack by bringing physical components closer together and shielding them from physical probes, and wherein the functions are performed within the integrated system such that authentication is performed entirely within a secured area, thereby protecting a transaction from outside manipulation or exposure.

It is a first object that the touch sensor, NFC and display functions can be physically performed simultaneously and/or independently from each other.

It is a second object that the form factor of the integrated system can be as small as a stand-alone touch sensor having an integrated NFC device used for contactless card communication, and as large as a keyless entry system.

It is a third object that the form factor of an integrated system includes a touchscreen as the touch sensor and a contactless card reader that is as small as a PIN entry device and as large as an ATM or other automated financial transaction device.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Figure 1:
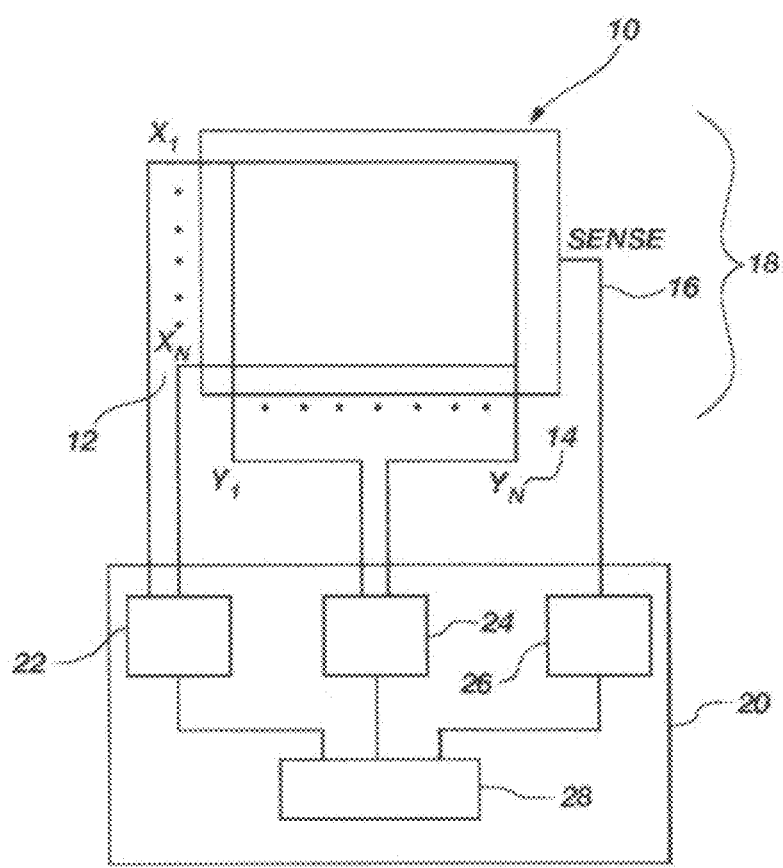
FIG. 1 is a block diagram of the components of a capacitance-sensitive touchpad as made by CIRQUE® Corporation and which can be operated in accordance with the principles of the present invention.

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The use of the term "touch sensor" should be considered as interchangeable with the terms "touch sensing device", "touchpad", "touch screen", touch panel" and "touch sensitive device" and other similar touch devices. Likewise, the term "near field communication antenna" should be considered as interchangeable with the terms "contactless card reader", "RFID reader" and "blue tooth antenna". Furthermore, the "system" referred to may include any combination of two or all three components comprised of a touch sensor, a near field communication antenna and a display, using all of the interchangeable terms. Accordingly, some embodiments are directed to touch screens that combine all three components, and some are directed to touchpads having NFC technology, with no display directly associated with the touch sensor itself.

The present invention may be implemented in various embodiments to address the different problems that are solved by the present invention. The problems that are addressed by these embodiments should be considered to include but not be limited to the system of touch sensor, NFC and display technology 1) where the components may interfere with each other, 2) preventing eavesdropping or intrusion into the system, 3) using too much space for an integrated system, and 4) needing to control an operating volume in accordance with standards for operating NFC technology.

In the prior art, integration of NFC, display and touch sensing technology usually includes placement of an NFC antenna around the touch sensor and the use of separate modules, communication capabilities and power cables resulting in increased size and complexity of an integrated system. It is therefore desirable to reuse or have shared use of components that can be used by more than one device.

In payment applications such as when using POS PIN entry devices, it is desirable to make the system secure from physical attack and yet provide a secure connection to the host. This may be implemented using the embodiments of the present invention.

In the embodiments of the present invention, NFC functions include but should not be considered limited to wireless communication functions such as using a contactless card reader for communication with a smart card, or reading a smart card at keyless entry system, or any other function that requires NFC technology, a display and a touch function.

Because an NFC enabled touch sensor is generally used in security related applications, it is a substantial improvement over the prior art to both physically and logically combine touch, display and communication functions into a single physically secure device. Accordingly, the present invention provides improved integration and security by combining NFC, display and touch sensor technology, or at least two of the three functions, into a single chip package, or in a tamper resistant security module or secure cryptographic device capable of withstanding an attacker attempting to eavesdrop or probe authentication activity.

While it may be novel to so closely integrate two or three form-factor authentication functions in a tamper resistant package or module, there are problems unique to close integration of NFC, display and touch technologies that have to be overcome in order to make the integrated system function as desired.

For example, consider the need for authentication of a financial transaction. In a two form-factor process, the first form factor is the entry of information that is supposedly known only to the user. This information is typically in the form of a personal identification number (PIN), and can be entered on a touch sensor. The second form factor is the use of a token in combination with a transaction authorization number (TAN). The TAN represents a one-time password to authenticate transactions. TANs can be distributed in different ways. The most secure way of using TANs is to generate them by need using a security token. These token generated TANs depend on the time and a unique secret, stored in the security token. Usually online banking with PIN/TAN is done via a web browser using SSL secured connections, so that there is no additional encryption needed.

By placing the circuitry for a touch sensor in very close proximity to the circuitry for NFC, it is possible to protect the communication that must take place between these systems in order to perform authentication. Security may be achieved in two ways. By physically making the systems close, they can operate without having to communicate using physically accessible lines of communication. By logically integrating the systems, they can operate independent of an operating system or any other unsecure system that would enable an intruder to gain access to the authentication information before it has been generated and encrypted.

The embodiments of the present are directed to bringing the physical components closer together, and then teaching how to prevent interference between the components.

Figure 2A:
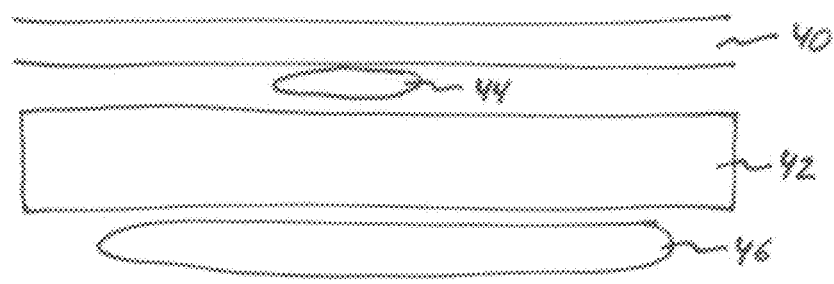
FIG. 2A is a cut-away profile view of a first embodiment of the present invention showing two separate NFC antennas, a large one for transmitting and a smaller one for receiving NFC signals.

FIG. 2A is a cut-away profile that shows the physical components of a first embodiment of the present invention. In this first embodiment, a system is shown having touch, display and NFC technology. Specifically, a touch sensor 40 is shown disposed on top of a display screen 42. This figure is directed to showing the stacking or stack-up arrangement of the various components, and not specific size relationships. A first NFC antenna 44 is shown disposed under the touch sensor 40, and a second NFC antenna 46 is shown disposed underneath the display screen 42.

FIG. 2A shows that the components are discrete, and do not share any physical components such as electrodes. The size of the first NFC antenna 44 should be understood as being smaller relative to the size of the second NFC antenna 46.

The relevance of the first embodiment may not be immediately clear. For example, the purpose in making the different sizes of NFC antennas is because of several factors. The first factor is that the first NFC antenna 44 is a receiving antenna. The receiving antenna may be smaller because it is a higher component in the stack-up of the system and is not being covered by other high attenuating component or components that generate electrical or magnetic interference. Another reason for the smaller size may be because of NFC specifications that provide for specific power and size limitations regarding the operating volume of NFC technology.

Another reason for making a smaller receiving antenna may be to limit the reach of the communication signals that it can receive. This limiting aspect has a practical reason for implementation. For example, smart cards may now include both a magnetic strip and an NFC antenna. If a user wants to swipe the magnetic strip and not perform a transaction using the NFC antenna in the smart card, it is important to limit the ability to communicate with the first NFC antenna 44. Thus, the first NFC antenna 44 may be implemented right under the center of the touch sensor 40 or on a side of the touch sensor that is farthest from a magnetic strip reader.

Figure 2B:
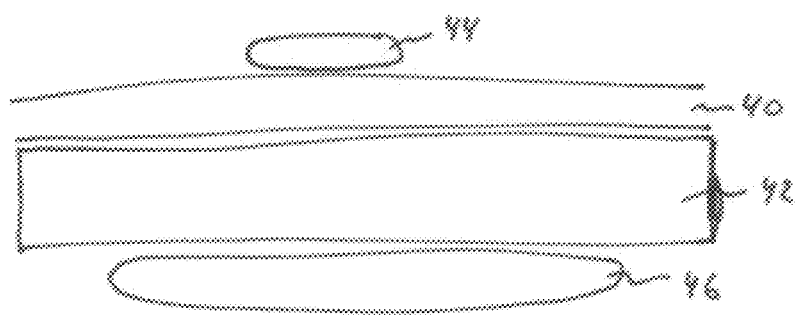
FIG. 2B is a cut-away profile view of an alternative embodiment of the present invention showing a different stack-up arrangement of the smaller NFC antenna.

FIG. 2B shows that in an alternative embodiment, the first NFC antenna 44 is disposed on top of the touch sensor instead of underneath it. This design may operate if the touch sensor 40 is able to compensate for the interference that may be caused by the first NFC antenna 44.

Figure 3:
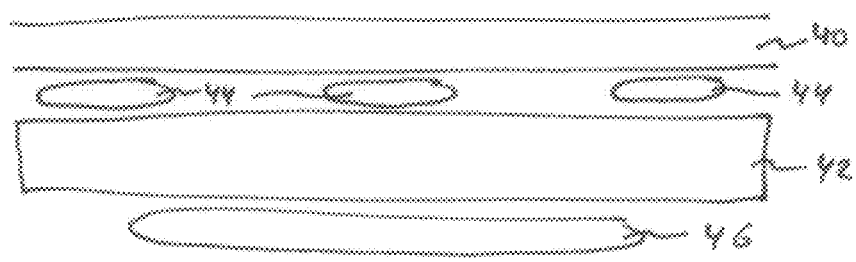
FIG. 3 is a cut-away profile view of an alternative embodiment where a plurality of receiving NFC antennas are shown.

FIG. 3 is provided to illustrate another aspect of the invention in a different embodiment. In this embodiment, a plurality of first NFC antennas 44 that receive signals are disposed just underneath the touch sensor 40. The receiving range of the first NFC antennas 44 is intentionally limited so that the first NFC antennas 44 can be directed to specific applications, or provide other functions as desired. For example, a plurality of limited first NFC antennas 44 may actually extend a receiving range of the NFC technology by using multiple smaller NFC antennas. Another function of the small first NFC antennas 44 may be to provide the ability to read small NFC tags or cards.

The other components of the system of FIG. 2 include the touch sensor 40. The touch sensor 40 may be implemented as a discrete and standalone device, or it may be integrated with the other components. For example, the XY electrode grid of the touch sensor 40 may be all or part of the electrodes that are used as part of the display screen 42. The electrodes may also be shared by the touch sensor 40, the display screen 42 and the second NFC antenna 46. The electrodes may also only be shared by the touch sensor 40 and the second NFC antenna 46. By sharing the electrodes, fewer electrodes are required to implement the system.

Figure 4:
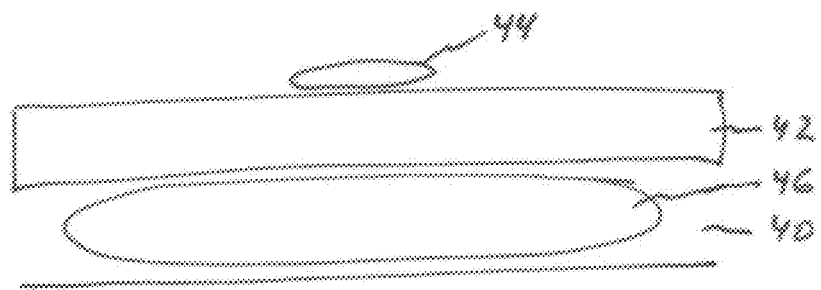
FIG. 4 is a cut-away profile view showing the touch sensor and the second NFC antenna sharing electrodes.

FIG. 4 is a cut-away profile view showing the touch sensor 40 and the second NFC antenna 46 sharing electrodes.

Figure 5:
FIG. 5 is a cut-away profile view showing the touch sensor and the display screen sharing electrodes.

FIG. 5 is a cut-away profile view showing the touch sensor 40 and the display screen 42 sharing electrodes.

Figure 6:
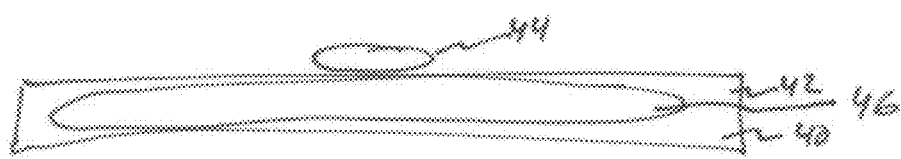
FIG. 6 is a cut-away profile view showing the touch sensor, the display screen and the second NFC antenna 46 sharing electrodes.

FIG. 6 is a cut-away profile view showing the touch sensor 40, the display screen 42 and the second NFC antenna 46 sharing electrodes.

When electrodes are shared, it is necessary to prevent interference between the components that are sharing them. Thus, in another embodiment of the present invention, a clocking oscillator used in the touch sensor 40 may also be used as the clocking oscillator for the first and second NFC antennas 44, 46 and the display screen 42. The use of a common clocking oscillator signal may provide double-rate sampling between the touch sensor 40, the display screen 42 and the first and second NFC antennas 44, 46, thereby preventing the unwanted signals from appearing on the any of the components. Double-rate sampling may form a notch filter at the fundamental carrier frequency of the second NFC antenna 46. This method of sampling may provide an excellent method of filtering because there is perfect synchronization between the touch sensor 40 and the second NFC antenna 46.

It may also be possible to coordinate or synchronize operation of the display with the other components. The present invention teaches how it may be possible to minimize cross-talk between the components of the present invention.

Regarding filtering, it should also be understood that another embodiment of the present invention is directed to the use of filtering components disposed in series with the electrodes of the touch sensor 40. These filtering components may be used to create notch filters or band-pass filters. The touch sensor 40 may operate in a range that is less than 1 MHz, and the NFC antennas may operate near the 13 MHZ range. Accordingly, the filters may be used to prevent interference between the NFC antennas and the touch sensor.

In one embodiment of the present invention, a capacitor may be placed on each electrode of the touch sensor 40, between the electrode and ground, to thereby shunt unwanted signal from the transmitting NFC antenna 46.

It should also be understood that the present invention is directed to simultaneous operation of the components of the system, as well as the ability to enable operation of a single component at a time. Accordingly, another embodiment of the present invention is directed to detection by the touch sensor 40 of activation of the second NFC antenna 46. This detection of activation of the second NFC antenna 46 may be accomplished by sampling of a signal from the second NFC antenna. Detection may be accomplished, for example, by connecting a GPIO input to sensing circuitry of the touch sensor 40. The GPIO input may be an electrode that is placed near to the second NFC antenna 46. The touch sensor 40 may deactivate itself for a period of time or for as long as the second NFC antenna 46 is transmitting.

Simultaneous operation of the touch sensor 40 and the second NFC antenna 46 may be accomplished by superimposing touch sensor drive signals with signals on the second NFC antenna through the use of summing operational amplifiers, an RF splitter or combiner, or other similar means as understood by those skilled in the art.

In an alternative embodiment, it may be a function of the present invention for the circuitry of the second NFC antenna 46 to detect when the circuitry of the touch sensor 40 is activated. The second NFC antenna 46 may deactivate itself for a period of time or for as long as the touch sensor 40 is sensing.

It may be desirable for the function of the touch sensor 40 to have preference or priority over the function of the second NFC antenna 46, or vice versa. Therefore, it is considered to be an aspect of the present invention to enable one of the devices to have priority over another device of the system. Having one component have priority over another is especially desirable when physical structures such as electrodes may be shared.

In another aspect of the invention, it may be desirable to perform an action that forces recognition of the touch sensor 40 or of the NFC antennas 44, 46. For example, a unique gesture or a touch zone on the touch sensor 40 may activate either component.

Turning to another component of the system, the display screen 42 may be implemented using any appropriate display screen technology. The display screen 42 may be implemented as any technology that is compatible with stand-alone or shared operation of the touch sensor 40 and the NFC antennas 44, 46. For example, the display screen 42 may be implemented, but should not be considered limited to, using display technology such as liquid crystal display (LCD), a light emitting diode (LED) display, and organic light emitting diode (OLED) display technology.

Another aspect of the invention is the relative sizes of the first NFC antenna 44 and the second NFC antenna 46. There may be fewer or no limitations or operating standards regarding operation of a transmitting NFC antenna. Accordingly, a larger NFC antenna may be disposed underneath all the other components of the present invention. Because it may be underneath all of the other components, the system may compensate for the extra material that a signal must pass through by making the transmitting NFC antenna larger than the receiving NFC antenna. The transmitting NFC antenna may also have the capability of being driven hard in order to drive the signal through the other components. The larger transmitting NFC antenna 46 may thus direct a large signal through the components that may be above it and in the direction of a receiving NFC card or tag. Thus, the second NFC antenna 46 is shown as being underneath the display screen 42, the touch sensor 40 and the smaller first NFC antenna 44 in FIG. 2.

Whereas it is preferable to use a low impedance antenna for the second NFC antenna 46, it is possible to use a low or a high impedance antenna for the first NFC antenna. Electrodes manufactured using indium tin oxide (ITO) may operate well for a high impedance antenna. ITO electrodes may be disposed on top of a display screen 42 and under a touch sensor 40, and may have the advantage of causing minimal interference with the visual clarity of the display screen.

Placing a low impedance transmitting NFC antenna around the perimeter of or below the touch sensor 40 and placing a high impedance receiving NFC antenna below or within the touch sensor may allow the active volume of the NFC antennas to be designed to meet industry standards or to have better control of a receiving position. The first NFC antenna 44 is coupled to a high input impedance input circuit of antenna circuitry that may process received signals, and the second NFC antenna 46 is coupled to a low output impedance driver circuit of the antenna circuitry that may generate and transmit signals.

Another aspect of the present invention is directed towards minimizing interference between the components of the system. Reducing interference may be useful because of electrical and/or magnetic fields generated by the components of the present invention. For example, the relatively high voltages used by the NFC antennas 44, 46 may be substantially greater than the voltages on the electrodes of the touch sensor 40.

The present invention may provide different methods for reducing interference between components. For example, in another embodiment of the present invention, interference may be reduced using balanced drive electrode patterns. Balanced drive electrode patterns are used to minimize the coupling of touch sensor 40 voltages onto the NFC antennas 44, 46. Balanced drive electrode patterns may also provide additional measurement headroom to the electronics of the touch sensor 40 to thereby compensate for interference by the second NFC antenna 46.

In another embodiment of the present invention, interference may be reduced by using symmetrical routing patterns for electrodes. Electric field interference created by the voltages placed on the second NFC antenna 46 may be canceled using symmetrical routing patterns such that the net voltage coupled onto any sense electrode of the touch sensor 40 is minimized. Similarly the magnetic field interference created by the transmission current in the second NFC antenna 46 may be canceled by using symmetrical electrode routing patterns such that the net current injected into any touch sensor 40 electrode pin is minimized.

In another embodiment of the present invention, a shielding ring may be disposed between the electrodes of the touch sensor 40 and the second NFC antenna 46 in order to suppress the electric field created by the second NFC antenna. It may be beneficial for the second NFC antenna 46 to apply a differential voltage to the shielding ring to help cancel the electric potential appearing on the second NFC antenna.

Shielding is another method for preventing interference between components of the system. For shielding purposes in the prior art, it was often helpful to insert a ground plane behind the electrode grid of a touch sensor to thereby prevent interaction with touchpad sensor circuitry that is placed behind an XY electrode grid, such as on opposites sides of a substrate for the XY electrode grid. Such a shielding ground plane would prevent interaction with an LCD if the touchpad were to be disposed in front of the LCD.

However, this type of ground plane as used in the prior art may allow for eddy currents to be generated within it as a result of activation of the NFC antenna, resulting in loss of magnetic field to an NFC smart card. Accordingly, it is another embodiment of the present invention to provide a method of preventing creation of eddy currents in a shielding ground plane.

Figure 7:
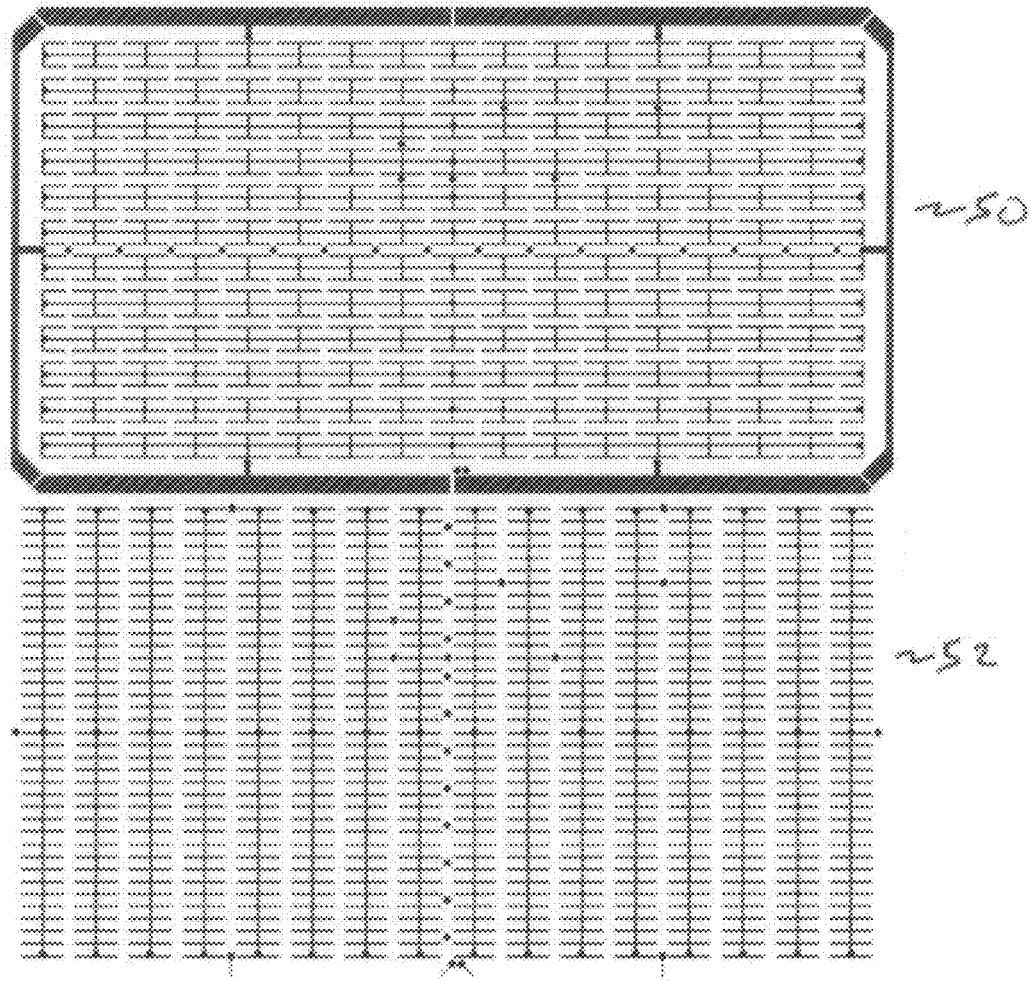
FIG. 7 is a top view of a first embodiment showing cuts in two layers of a ground plane that illustrates the concepts of the present invention

FIG. 7 is provided to show one method of preventing eddy currents in a shielding ground plane. FIG. 7 is a top view of an embodiment showing two layers 50 and 52 of a touch sensor. Preventing eddy currents may be accomplished by making cuts within the electrodes of the ground plane while maintaining the suppression of electric field potential. The cuts separate the electrodes into smaller and discrete electrodes that may minimize the creation of eddy currents. When making the cuts in the ground plane electrodes, it is important that the cuts may be made so that no closed loop is formed, except to form a conductive path that is suitable to form an NFC antenna if that is needed. Accordingly, any design may be used for the electrodes of a ground plane that accomplishes the purpose of minimizing the creation of eddy currents and which does not create closed loops.

Figure 8:
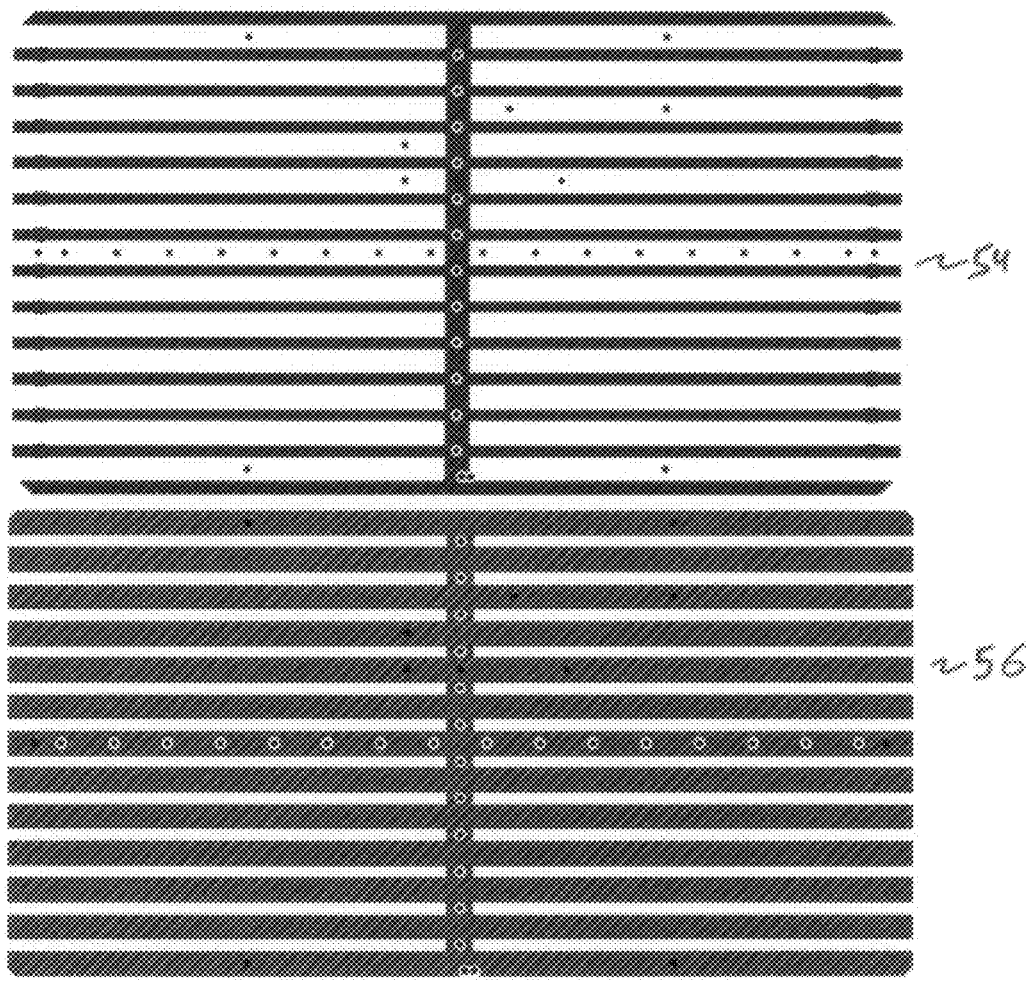
FIG. 8 is a top view of an alternative embodiment to the ground plane of FIG. 7.

FIG. 8 is a top view of an embodiment that shows a ground plane that may be used with the touch sensor of FIG. 7. Note that when the two layers 54 and 56 of the ground plane are superimposed over each other, they are interdigitated and will provide a complete shield relative to both magnetic and electric fields.

Figure 9:
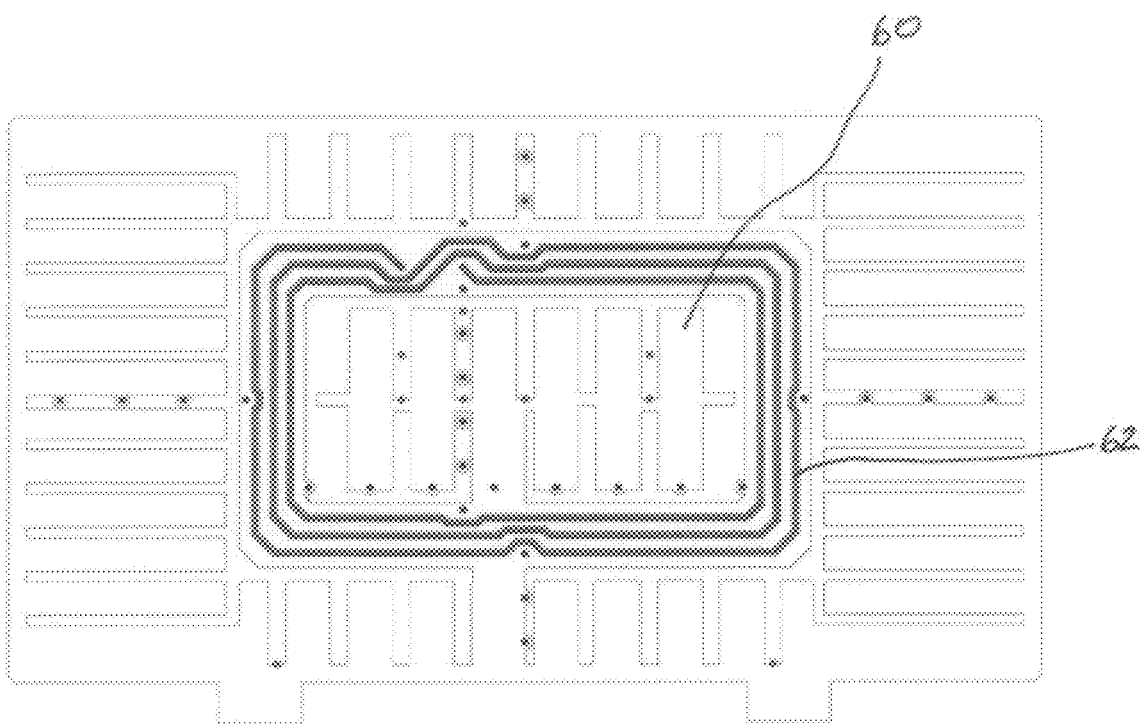
FIG. 9 is a ground plane implemented on the same substrate as an NFC antenna.

FIG. 9 is a top view of another embodiment of the present invention. This figure shows a ground plane implemented on the same substrate as an NFC antenna. The NFC antenna 60 is shown in the middle of the substrate, surrounded by a "split donut" ground ring 62 that is shielding the NFC antenna.

Another purpose of creating the cuts in the electrodes of the ground plane, other than minimizing wasted current from the magnetic fields, is to maximize shielding for the electric fields.

The present invention has described the shared use of electrodes between the components of the present invention. In another embodiment of the present invention, a ground plane may be shared with the transmitting NFC antenna.

In another embodiment of the present invention, electrodes of the touch sensor and the NFC antennas may be interleaved on a same substrate.

Figure 10:
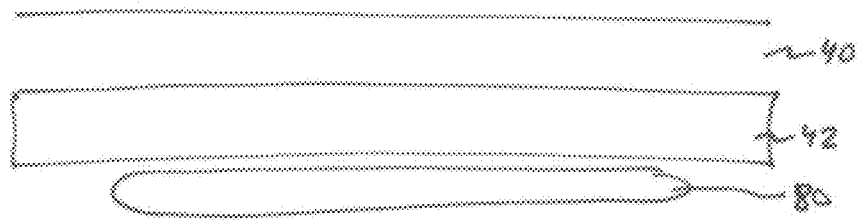
FIG. 10 is a stack-up comprised of a touch sensor, a display screen, and an NFC antenna that is for both transmitting and receiving.

FIG. 10 illustrates another aspect of the present invention that is directed to the use of a directional coupler. A directional coupler may be used to increase the sensitivity of an NFC antenna. For example, this may be useful when the NFC antenna disposed under the touch sensor 40, the display screen 42, or both the touch sensor and the display screen, might be used to receive NFC signals as well as to transmit NFC signals. Accordingly, a directional coupler may be used to increase a range or sensitivity of the single transmitting and receiving NFC antenna. In one embodiment shown in FIG. 10, the stack-up is comprised of a touch sensor 40, a display screen 42, and an NFC antenna 80 that is for both transmitting and receiving NFC signals. The touch sensor 40, the display screen 42 and the NFC antenna 80 may also share physical structures such as electrodes.

In another embodiment of the present invention, in order to reduce interference from electrical and magnetic fields, it may be possible to compress the fields being generated by the components of the system. Disposing ferrite on or near substrates of the components may compress the fields. As a practical matter, ferrite might be suspended in silicon or other material, and then the ferrite suspended in the silicon may be disposed on the substrates. Ferrite may also be disposed on the substrate directly in a ring or other suitable structure.

Figure 11:
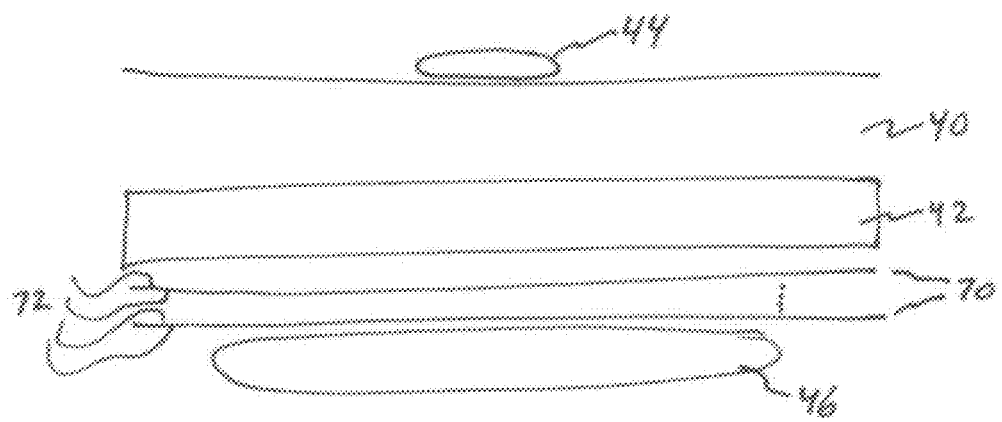
FIG. 11 shows that at least one substrate 70 may be disposed between the touch sensor and the second NFC antenna.

FIG. 11 is provided as another embodiment of the present invention. In a modification of the embodiment shown in FIG. 2, FIG. 11 shows that at least one additional substrate 70 may be disposed between the touch sensor 40 and the second NFC antenna 46. The at least one substrate may include conductive surfaces 72. The conductive surfaces 72 may be coupled together at a common point. The purpose of the conductive surfaces is to suppress interference that may be caused by electric and magnetic fields generated by the second NFC antenna 46.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A system that integrates a touch sensor and near field communication antenna technology to provide communications in a touch sensitive portable electronic appliance, said system comprising:
 a display screen;
 a touch sensor disposed on top of the display screen to thereby create a touchscreen;
 a receiving near field communication antenna disposed between the display screen and the touch sensor and that may only function for receiving a signal; and
 a transmitting near field communication antenna disposed underneath the display screen and that may only function for transmitting a signal through the touchscreen, wherein the receiving near field communication antenna is smaller than the transmitting near field communication antenna.

2. The system as defined in claim 1 wherein the system is further comprised of a ground plane disposed between the transmitting near field communication antenna and the touch sensor, wherein the ground plane includes a plurality of electrodes that are formed so that there are no closed loops to thereby minimize eddy currents in the electrodes.

3. The system as defined in claim 1 wherein the system is further comprised of a ground plane on a same substrate as the transmitting near field communication antenna, wherein the ground plane includes a plurality of electrodes that are formed so that there are no closed loops to thereby minimize eddy currents in the electrodes.

4. The system as defined in claim 1 wherein the system is further comprised of a ground plane disposed under the transmitting near field communication antenna, wherein the ground plane includes a plurality of electrodes that are formed so that there are no closed loops to thereby minimize eddy currents in the electrodes.

5. The system as defined in claim 1 wherein the system is further comprised of:
 a low or a high impedance material being used for the receiving near field communication antenna; and
 a low impedance material being used for the transmitting near field communication antenna.

6. The system as defined in claim 5 wherein the system is further comprised of an antenna circuit having a high input impedance input circuit for receiving an input signal from the receiving near field communication antenna, and a low output impedance driver circuit for transmitting a signal to the transmitting near field communication antenna.

7. The system as defined in claim 1 wherein the system is further comprised of disposing ferrite material on at least one substrate of the system to thereby compress electric or magnetic fields generated by the system.

8. The system as defined in claim 1 wherein the system is further comprised of at least one substrate disposed between the touch sensor and the transmitting NFC antenna, wherein a conductive material is disposed on a surface of the at least one substrate to thereby reduce electrical field interference of the transmitting NFC antenna with the touch sensor.

9. The system as defined in claim 8 wherein the system is further comprised of a conductive electrode that is coupled to all of the conductive material on the at least one substrate to thereby electrically couple all of the conductive material.

10. The system as defined in claim 8 wherein the system is further comprised of a filter disposed on each electrode of the touch sensor to thereby prevent interference of the transmitting NFC antenna with the touch sensor.

11. The system as defined in claim 10 wherein the system is further comprised of a capacitor disposed on each electrode of the touch sensor to thereby shunt signals from the transmitting NFC antenna to ground.

12. The system as defined in claim 1 wherein the system is further comprised of a common oscillator clocking signal that is used by the touch sensor, the display screen and the NFC antennas to thereby minimize unwanted signals between the touch sensor, the display screen and the NFC antennas.

13. The system as defined in claim 1 wherein the system is further comprised of a sensor for detecting activation of the transmitting NFC antenna, to thereby enable the touch sensor to modify sensing functions.

14. The system as defined in claim 1 wherein the system is further comprised of a sensor for detecting activation of the touch sensor, to thereby enable the transmitting NFC antenna to terminate communication functions.

15. The system as defined in claim 1 wherein the system is further comprised of a switch in the touch sensor that enables activation of the receiving NFC antenna, the transmitting NFC antenna, or a combination of the two.

16. The system as defined in claim 1 wherein the system is further comprised of a synchronization circuit for synchronizing functions of the touch sensor, the receiving near field communication antenna, the transmitting near field communication and the display screen.

17. The system as defined in claim 1 wherein the system is further comprised of a mutual capacitance touch sensor.

18. The system as defined in claim 1 wherein the system is further comprised of the display screen being selected from the group of display screens comprised of a liquid crystal display, a light emitting diode display, and an organic light emitting diode display.

19. The system as defined in claim 1 wherein the system is further comprised of a directional coupler connected to the receiving near field communication antenna if the receiving near field communication antenna is used to receive a signal.

20. A method for integrating a touch sensor and near field communication antenna technology to provide communications in a touch sensitive portable electronic appliance, said method comprising:
1) providing a display screen, a touch sensor disposed on top of the display screen to thereby create a touch-screen, a receiving near field communication antenna that may only receive signals and is disposed between the touch sensor and the display screen for receiving a signal, and a transmitting near field communication antenna that may only transmit signals and is disposed under or around the display screen for transmitting a signal, wherein the receiving antenna is smaller than the transmitting antenna; and
2) transmitting a near field communication signal from the transmitting near field communication antenna through the display screen, the touch sensor and the receiving near field communication antenna; and
3) receiving a near field communication signal on the receiving near field communication antenna.

21. The method as defined in claim 20 wherein the method is further comprised of:
1) disposing a ground plane between the transmitting near field communication antenna and the touch sensor; and
2) forming a plurality of ground plane electrodes so that there are no closed loops to thereby minimize eddy currents in the electrodes.

22. The method as defined in claim 20 wherein the method is further comprised of:
1) disposing a ground plane on a same substrate as the transmitting near field communication antenna; and
2) forming a plurality of ground plane electrodes so that there are no closed loops to thereby minimize eddy currents in the electrodes.

23. The method as defined in claim 20 wherein the system is further comprised of:
1) disposing a ground plane on a substrate under the transmitting near field communication antenna; and
2) forming a plurality of ground plane electrodes so that there are no closed loops to thereby minimize eddy currents in the electrodes a ground plane.

24. The method as defined in claim 20 wherein the method is further comprised of:
1) providing a low or a high impedance material for the receiving near field communication antenna; and
2) providing a low impedance material being used for the transmitting near field communication antenna.

25. The method as defined in claim 24 wherein the method is further comprised of providing an antenna circuit having a high input impedance input circuit for receiving an input signal from the receiving near field communication antenna, and a low output impedance driver circuit for transmitting a signal to the transmitting near field communication antenna.

26. The method as defined in claim 20 wherein the method is further comprised of suppressing electric or magnetic fields generated by the system by disposing ferrite material on at least one substrate of the system to thereby.

27. The method as defined in claim 20 wherein the method is further comprised of reducing electrical field interference of the transmitting NFC antenna on the touch sensor by disposing at least one substrate between the touch sensor and the transmitting NFC antenna, wherein a conductive material is disposed on a surface of the at least one substrate.

28. The method as defined in claim 27 wherein the method is further comprised of preventing interference of the transmitting NFC antenna on the touch sensor by disposing a filter on each electrode of the touch sensor.

29. The method as defined in claim 28 wherein the method is further comprised of shunting signals from the transmitting NFC antenna to ground by disposing a capacitor on each electrode of the touch sensor to thereby.

30. The method as defined in claim 20 wherein the method is further comprised of minimizing unwanted signals on the touch sensor from the transmitting NFC antenna by using a common oscillator clocking signal that is used by the touch sensor and the transmitting NFC antenna.

31. The method as defined in claim 20 wherein the method is further comprised of terminating sensing functions by detecting activation of the transmitting NFC antenna by using a sensor.

32. The method as defined in claim 20 wherein the method is further comprised of terminating communication functions by detecting activation of the touch sensor.

33. The method as defined in claim 20 wherein the method is further comprised of enabling activation of the receiving NFC antenna, the transmitting NFC antenna, or a combination of the two by activating a switch in the touch sensor.

34. The method as defined in claim 20 wherein the method is further comprised of synchronizing functions of the touch sensor, the receiving near field communication antenna, the transmitting near field communication and the display screen to thereby minimize interference of the components.

35. The method as defined in claim 20 wherein the method is further comprised of selecting the display screen from the group of display screens comprised of a liquid crystal display, a light emitting diode display, and an organic light emitting diode display.

36. The method as defined in claim 20 wherein the method is further comprised of increasing sensitivity of the receiving NFC antenna by coupling a directional coupler to the receiving near field communication antenna if the receiving near field communication antenna is used to receive a signal.

37. A system that integrates a touch sensor and near field communication antenna technology to provide communications in a touch sensitive portable electronic appliance, said system comprising:
- a display screen having a plurality of display electrodes for generating a display;
- a touch sensor that shares the plurality of display electrodes in order to perform proximity and touch sensing, and to create a touchscreen for use with the display screen; and
- a transmitting near field communication antenna that may only transmit signals and is disposed under or around the display screen for transmitting a signal through the touchscreen; and
- a receiving near field communication antenna that may only receive signals and is disposed under the touchscreen for receiving a signal, wherein the receiving near field communication antenna is smaller than the transmitting near field communication antenna.

38. A system that integrates a touch sensor and near field communication antenna technology to provide communications in a touch sensitive portable electronic appliance, said system comprising:
- a display screen having a plurality of display electrodes for generating a display;
- a touch sensor that shares the plurality of display electrodes in order to perform proximity and touch sensing, and to create a touchscreen with the display screen;
- a transmitting near field communication antenna that may only transmit signals and that shares the plurality of display electrodes in order to transmit a signal through the touchscreen; and
- means for controlling use of the plurality of display electrodes to enable the display screen, the touch sensor and the transmitting near field communication antenna to share the use of the plurality of display electrodes.

39. The system as defined in claim 38 wherein the system is further comprised of a receiving near field communication antenna that may only receive signals and is disposed on top of the touchscreen for receiving a signal, wherein the receiving near field communication antenna is smaller than the transmitting near field communication antenna.

* * * * *